United States Patent [19]

Arai et al.

[11] Patent Number: 4,565,643

[45] Date of Patent: Jan. 21, 1986

[54] ANTIFREEZING AGENT

[75] Inventors: Soichi Arai, Yokohama; Michiko Watanabe, Matsudo, both of Japan

[73] Assignee: Kanegafuchi Kagaku Kogyo Kabushiki Kaisha, Osaka, Japan

[21] Appl. No.: 648,216

[22] Filed: Sep. 7, 1984

[30] Foreign Application Priority Data

Apr. 24, 1984 [JP] Japan ................... 59-82553

[51] Int. Cl.$^4$ ............................................. C09K 5/06
[52] U.S. Cl. ................................. 252/70; 260/112 R; 260/117; 260/119; 260/121; 252/73
[58] Field of Search ............... 252/70, 73; 260/112 R, 260/117, 119, 121

[56] References Cited

U.S. PATENT DOCUMENTS 3,712,865  1/1973  Evans et al. ................. 260/121

FOREIGN PATENT DOCUMENTS 2001095  1/1979  United Kingdom .

OTHER PUBLICATIONS

Ananthanarayanan et al., "A Synthetic Polypeptide with Antifreeze Activity," Nature (London) 1977, 268(5620), 560-561, (CA 88: 984r).

Slaughter et al., "Antifreeze Proteins from the Sea Raven . . . ," J. Biol. Chem. 1981, 256(4), 2022-2026, (CA 94: 98314u).

Watanabe et al., "Proteinaceous Surfactants Produced from Gelatin by Enzymatic Modification . . . ," J. Food Science 1981, 46, 1467-1469.

Knight et al., "Fish Antifreeze Protein and the Freezing and Recrystallization of Ice," Nature (London) 1984, 308(5956), 295-296, (CA 100: 170225c).

Primary Examiner—Paul Lieberman
Assistant Examiner—Robert A. Wax
Attorney, Agent, or Firm—Armstrong, Nikaido, Marmelstein & Kubovcik

[57] ABSTRACT

An antifreezing agent used in an aqueous medium system comprising a protein which is enzymatically modified with covalent incorporation of an amino acid ester. The antifreezing agent can keep an unfrozen state of the system down to −10° C., and does not exert any harmful effect to biological bodies.

10 Claims, 2 Drawing Figures

ANTIFREEZING AGENT

BACKGROUND OF THE INVENTION

The present invention relates to an antifreezing agent used in an aqueous medium system, comprising a protein which is enzymatically modified with covalent incorporation of an amino acid ester.

Preservation of aqueous medium systems in foods, biological bodies, and the like has been performed, in most cases, at a low temperature or in frozen state. When the aqueous medium systems mentioned above are subjected to a temperature below the freezing point of the aqueous system, however, tissue destruction results because of formation of ice crystals. Such destruction takes place by shearing the tissue with a knife of the formed ice crystal. Size of ice crystal growth maximizes at a temperature of $-1°$ to $-5°$ C.

There have been made various attempts in order to prevent the above-mentioned type of destruction of tissues. For example, in order to prevent ice crystals from growing to huge crystals, there is practiced a method in which the aqueous medium system is rapidly cooled to a temperature of $-30°$ C. to $-50°$ C. by using liquid nitrogen, whereby the temperature of the system can quickly pass through the temperature zone of maximum ice crystal formation. According to this method, the formed ice crystals are fine. There is also practiced a method in which to the aqueous medium system is added an antifreezing agent such as polyvinyl pyrrolidone which makes the freezing of the system in the temperature zone of maximum ice crystal formation inhibit.

However, the rapid freezing method described as the former method implies defects that it is unavoidable to lower the quality of products to a certain extent, and moreover that application of the method is restricted from a viewpoint of equipment requirement, as well as the consumption of a tremendous amount of energy for freezing the raw materials, and for storing and thawing the products. The latter method in which an antifreezing agent is added to the system also implies defects that all agents known as antifreezing agents cannot be used for foods, and that the desired antifreezing activity cannot be obtained unless the antifreezing agents are added in a relatively large amount.

On the other hand, in order to endow a protein with various functions, there is proposed a method in which verious chemical species are covalently attached to proteins in the presence of an enzyme. In many cases, the enzymatically modified protein (hereinafter referred to as "EMP") is considerably differ in function from the original protein.

In the course of studying on EMP, the present inventors have found the fact that an amino acid attached EMP prepared by using an amino acid ester as a chemical species exhibits an excellent antifreezing effect in various aqueous medium systems.

An object of the present invention is to provide an antifreezing agent used in an aqueous medium system, which is not only safe in biological bodies and effective in a small amount, but also able to maintain a stable unfrozen state over a long period of time.

SUMMARY OF THE INVENTION

The present invention relates to an antifreezing agent used in aqueous medium system, comprises an enzymatically modified protein with covalent incorporation of an amino acid ester.

DETAILED DESCRIPTION

Figure 1:
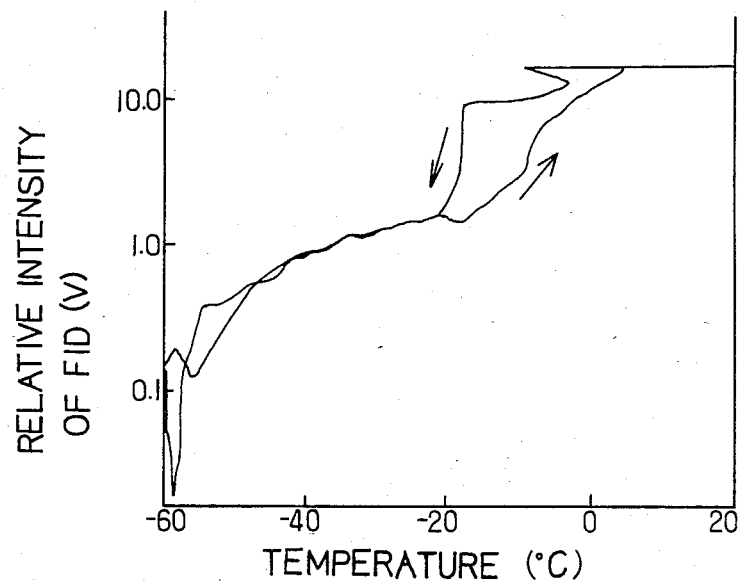
FIG. 1 shows a freezing-thawing curve of EMG-12 prepared in Example 1 by measuring with a temperature variable pulsed NMR.

The EMP in the present invention has an excellent emulsifiability and comprises a hydrophilic protein portion and a hydrophobic amino acid ester portion.

Examples of the proteins used in the present invention are, for instance, casein, gelatin, albumin, lactoalbumin, soy protein, fish protein, and the like. Among the above proteins, proteins such as casein whose solubility in water is not sufficient may be previously subjected to succinylation or acylation in order to increase the solubility in water.

Preferable amino acid esters with which proteins should be modified are, for instance, an ester of an amino acid with an aliphatic alcohol. Examples of the amino acids are, for instance, leucine, norleucine, alanine, and the like. Preferable aliphatic alcohols have 4 to 16 carbon atoms in a molecule. When the number of carbon atoms in the aliphatic alcohol becomes smaller, foaming ability of the antifreezing agent tends to be greater, while when the number of carbon atoms in the aliphatic alcohol becomes larger, the emulsifiability tends to be greater.

Examples of preferable EMP are, for instance, succinylcasein modified with covalent incorporation of leucine dodecyl ester, gelatin modified with covalent incorporation of leucine decyl ester, gelatin modified with covalent incorporation of leucine dodecyl ester, and the like. The EMP, i.e. the protein to which the amino acid ester is covalently attached can be prepared, as described in Watanabe et al, Journal of Food Science 46, 1467–1469 (1981), by subjecting the protein and the amino acid ester to an enzymatic reaction in an aqueous solvent. It is preferable to carry out the reaction by employing a water-aceton system, a water-ethanol system, or the like, as the aqueous solvent system, and by using a thiol protective agent such as 2-mercaptoethanol, cysteine, or the like. Since the process for preparing the EMP is easily carried out, the EMP can be produced in a large quantity in industrial scale.

The suitable conditions of the reaction should be determined depending on kinds of protein, kinds of enzyme, the number of carbon atoms of the alcoholic portion of the amino acid ester, and the like. Generally the reaction may be carried out at 5° to 50° C. for 1 to 30 minutes by adjusting the pH of the reaction mixture to 7 to 10.

As the enzyme, there is preferably employed a thiol protease such as papain, bromelain or ficin.

The EMP obtained according to the above-mentioned enzymatic reaction has a molecular weight of 2,000 to 40,000.

The aqueous medium system as used in the present invention may include any medium which contains water, such as water; an aqueous solution in which various solutes are dissolved; water phase in an emulsion of water and oil; water in animals and plant tissues such as water in cytoplasm; water contained in blood; and an aqueous mixture in which organic solvents missible with water are mixed in any proportion.

The antifreezing agent of the present invention comprising the above-mentioned EMP to which an amino acid ester is covalently attached can considerably lower a freezing point of the aqueous medium system, at least to a temperature lower than a temperature in the zone of maximum ice crystal formation, i.e. lower than −5° C. Though the mechanism of the phenomenon has not yet been clearly understood, it is assumed that the antifreezing effect is not caused from the effect of freezing point depression which is usually observed when a salt is added to an aqueous medium system, but is caused from the supercooling effect on the basis of antinucleation whereby growth of ice crystals is depressed due to strong interaction between the EMP and an ice nucleus.

Therefore, the antifreezing effect can be accomplished by adding the antifreezing agent of the present invention at a concentration of 0.03 to 0.04% (% by weight, hereinafter the same) which is the critical micelle concentration of the antifreezing agent.

An amount of the antifreezing agent varies depending on the desired strage temperature, kinds of product to be frozen, a rate of cooling, and the like, but is usually 0.03 to 10%, preferably 0.5 to 5%.

The antifreezing agent of the present invention has a surprising effect other than the above-mentioned antifreezing effect. That is, even if the supercooling state is broken and ice crystals are formed, the antifreezing agent of the present invention can prevent the ice crystal growth to some extent.

The antifreezing agent of the present invention may be dispersed or dissolved in an aqueous medium, or emulsified by stirring or by ultrasonication to form an antifreezing emulsion. Further, in case of using the antifreezing agent in foods or biological bodies, an aqueous solution of the antifreezing agent may be applied thereto to impregnate, or the foods or bodies may be soaked in the aqueous solution of the antifreezing agent.

Since the amino acid ester attached EMP used in the present invention has an excellent emulsifiability, the system can be kept stable over a long period of time when the system is in a form of an antifreezing emulsion, as well as in the aqueous dispersion system.

In addition, since the antifreezing agent in the present invention is proteinaceous origin, there is no problem for biological bodies even when the antifreezing agent is added to foods and ingested within biological bodies. The antifreezing agent is easily digested by proteases in biological bodies. In case of not ingesting the antifreezing agent into body, the antifreezing agent can be easily removed by digesting with proteases and washing.

The antifreezing agent of the present invention has an antifreezing effect over the temperature zone of maximum ice crystal formation, and does not exert any harmful effect against biological bodies. Quality of the products or bodies can be kept stable in antifrozen state down to −10° C. Thus energy cost for cooling can be remarkably reduced. Also, the antifreezing agent is effective in an extremely small amount, and mass production of the antifreezing agent can be performed, which makes the total cost reduced.

The antifreezing agent of the present invention can be used in all systems which contain water, and is quite useful for cold storage of, for instance, fresh foods such as fishes and shellfishes, meats and vegetables; processed foods which is water-in-oil or oil-in-water emulsion such as shoe creams and cakes; biological tissues such as organs and cells; cosmetics; oils which are readily oxidized; useful proteins which readily deteriorate under freezing; and the like.

The present invention is more particularly described and explained by means of the following Examples. It is to be understood that the present invention is not limited to the Examples, and various changes and modifications may be made in the invention without departing from the spirit and scope thereof.

EXAMPLE 1

Comercially available gelatin was added to 1M carbonate buffer (pH 9) containing cysteine (10 mM) and ethanol (20%) so that the final concentration of the gelatin was 33%. Then, per 100 g of the gelatin, 0.1 mole of L-leucine decyl ester and 1 g of papain were added to the above carbonate buffer.

The mixture was allowed to react for 15 minutes at 37° C., and then the enzymatic reaction was stopped by lowering the pH to 1 with 1N hydrochloric acid. After the reaction, the mixture was dialyzed against running water and the dialysate was collected and lyophilized.

The lyophilized dialysate was washed with dichloromethane and acetone to give a purified gelatin modified with covalent incorporation of L-leucine decyl ester having an average molecular weight of 7,300 (hereinafter referred to as "EMG-10").

EXAMPLE 2

The procedures in Example 1 were repeated except that L-leucine dodecyl ester was employed instead of L-leucine decyl ester to give a purified gelatin modified with covalent incorporation of L-leucine dodecyl ester having an average molecular weight of 7,300 (hereinafter referred to as "EMG-12").

EXAMPLE 3

The procedures in Example 1 were repeated except that L-leucine butyl ester was employed instead of L-leucine decyl ester to give a purified gelatin modified with covalent incorporation of L-leucine butyl ester (hereinafter referred to as "EMG-4").

EXAMPLE 4

The procedures in Example 1 were repeated except that L-leucine octyl ester was employed instead of L-leucine decyl ester to give a purified gelatin modified with covalent incorporation of L-leucine octyl ester (hereinafter referred to as "EMG-8").

EXAMPLE 5

An aqueous dispersion of 5% EMP (pH 7) was prepared by dispersing the EMP obtained in Example 1 or Example 2. An equal volume of linoleic acid (having freezing point of −12° C.) was added to the dispersion, and then the dispersion was emulsified by ultrasonication to give an emulsion.

After each emulsion thus obtained was allowed to stand for 24 hours at −5° C. and −10° C., presence of the freezing state in the emulsion was detected by observing the intensity of the free induction decay (FID) at 60 $\mu$ seconds with a pulsed NMR. The results are shown in Table 1.

COMPARATIVE EXAMPLE 1

Emulsions were prepared in the same manner as in Example 5 except that antifreezing agents shown in Table 1 were employed, and presence of the freezing state of the emulsions were detected by the same manner as in Example 5. The results are shown in Table 1.

TABLE 1

|  | Antifreezing agent | State of freezing −5° C. | −10° C. |
|---|---|---|---|
| Example 5 | EMG-10 | unfrozen | unfrozen |
|  | EMG-12 | unfrozen | unfrozen |
| Comparative | Tween - 80 | frozen | frozen |
| Example 1 | Polyglycerol stearate | unfrozen | unfrozen |
|  | Sodium Caseinate | frozen | frozen |
|  | Sodium soy proteinate | frozen | frozen |

As is clear from Table 1, the antifreezing agent of the present invention has a sufficient antifreezing effect in the temperature zone of maximum ice crystal formation. Polyglycerol stearate also has an antifreezing activity to the same extent as in the use of the antifreezing agent of the present invention, but has several problems that polyglycerol stearate is a synthetic material, and is poor in solubility to water, and also has low probability to keep the solution in unfrozen state.

Figure 2:
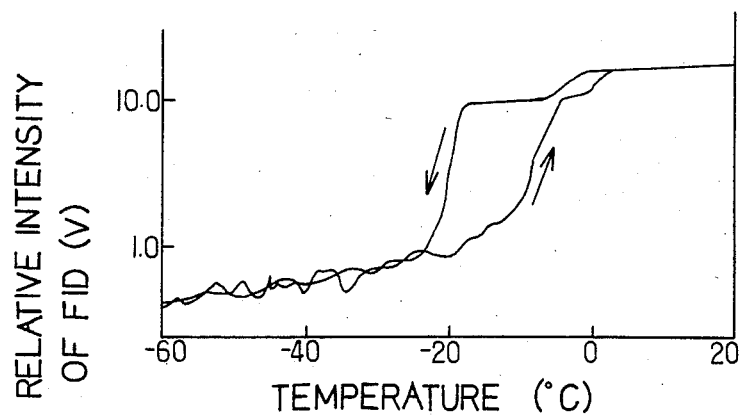
FIG. 2 shows a freezing-thawing curve of the isolated sodium soy proteinate prepared in Comparative Example 1 by measuring with a temperature variable pulsed NMR.

For reference, freezing-thawing curves of the emulsions which were prepared by using EMG-12 and the isolated sodium soy proteinate are shown in FIGS. 1 and 2, respectively. The temperature variable pulsed NMR was operated at 20 MHz (interval of 90° pulses being two seconds) for the measurements.

As shown in FIGS. 1 and 2, in the emulsion of EMG-12 a supercooling effect is observed, and also it is observed that subsequent growth of ice crystals occures gradually.

EXAMPLE 6

EMG-4, EMG-8 and EMG-12 were dispersed in water to give a respective aqueous dispersion at a concentration of 1%.

After adding a small amount of silver iodide as ice nucleues to each dispersion, the dispersion was gradually cooled. The temperature at which the dispersion started to freeze was measured. The results are shown in Table 2.

COMPARATIVE EXAMPLE 2

The experiment in Example 6 was repeated except that gelatin, gelatin hydrolysate, sodium caseinate, isolated sodium soy proteinate, and polyglycerol stearate were used instead of the EMG, or no EMG was used. The results are shown in Table 2.

TABLE 2

|  | Antifreezing agent | Freezing point (°C.)* |
|---|---|---|
| Example 6 | EMG-4 | −5.2 ± 0.4 |
|  | EMG-8 | −6.2 ± 0.9 |
|  | EMG-12 | −7.0 ± 0.8 |
| Comparative | gelatin | −0.5 ± 0.1 |
| Example 2 | gelatin hydrolysate | −1.2 ± 0.5 |
|  | Sodium caseinate | −0.5 ± 0.5 |
|  | Isolated sodium soy caseinate | −0.6 ± 0.3 |
|  | Polyglycerol stearate | −7.8 ± 0.9 |
|  | — | −0.4 ± 0.1 |

*average value ± standard deviation (number of repitition for each 10 times)

EXAMPLE 7

EMG-12 was dispersed in water at various conentrations and the dispersion of each concentration of EMG-12 was cooled with or without addition of silver iodide. The temperature at which the dispersion started to freeze was measured. The results are shown in Table 3.

COMPARATIVE EXAMPLE 3

The experiment in Example 7 was repeated except that polyglycerol stearate was used instead of EMG -12. The results are shown in Table 3.

TABLE 3

|  | Antifreezing agent | Concentration (%) | Freezing point (°C.)* Presence of silver iodide | Absence of silver iodide |
|---|---|---|---|---|
| Example 7 | EMG-12 | 0 | −0.4 ± 0.1 | —** |
|  |  | 0.01 | −0.5 ± 0.1 | —** |
|  |  | 0.03 | −6.8 ± 1.0 | —** |
|  |  | 0.1 | −6.9 ± 0.6 | —** |
|  |  | 0.3 | −7.0 ± 0.9 | —** |
|  |  | 1 | −7.0 ± 0.8 | −8.3 ± 0.9 |
|  |  | 3 | −7.2 ± 1.1 | −8.5 ± 0.5 |
|  |  | 10 | −7.2 ± 0.5 | −8.0 ± 0.6 |
| Comparative | Polyglycerol | 0 | −0.4 ± 0.1 | —** |
| Example 3 | stearate | 0.3 | −3.5 ± 0.5 | —** |
|  |  | 1 | −7.8 ± 0.9 | −4.9 ± 0.5 |
|  |  | 3 | −8.2 ± 0.4 | −7.5 ± 1.0 |
|  |  | 10 | −8.8 ± 0.8 | −9.8 ± 0.6 |

*Average value ± standard deviation (number of repitition: 10 times)
**Statistical analysis could not be performed because data were not consistent.

EXAMPLE 8

Two groups each of which consisted of 10 identical samples of 1% aqueous dispersions of EMG-12 were prepared. After the one group and the other group were allowed to stand for 24 hours at −5° C. and −7° C., respectively, the stability (characteristic of preserving unfrozen state) of the dispersion was measured. The results are shown in Table 4.

COMPARATIVE EXAMPLE 4

The experiment in Example 8 was repeated by using polyglycerol stearate. The results are shown in Table 4.

TABLE 4

|  | Antifreezing agent | Temperature of dispersion (°C.) | Characteristic of preserving unfrozen state* (%) Presence of silver iodide | Absence of silver iodide |
|---|---|---|---|---|
| Example 8 | EMG-12 | −5 | 100 | 100 |
|  |  | −7 | 20 | 60 |
| Comparative | Polyglycerol | −5 | 40 | 100 |
| Example 4 | stearate | −7 | 0 | 40 |

*For example, when 2 samples among 10 samples were not frozen, the characteristic of preserving unfrozen state is indicated as 20%.

It is clear from Table 4, when polyglycerol stearate was used as an antifreezing agent, the capability of preserving unfrozen state was not good, though polyglycerol stearate had an antifreezing effect as good as EMG-12.

What we claim is:

1. A method for preventing destruction in biological tissues caused from the formation of ice crystals during exposure to a low temperature or a frozen state, said method comprising; contacting the biological tissues with an anti-freezing agent comprising, in an aqueous medium system, a protein which is enzymatically modified with the covalent incorporation of an amino acid ester.

2. The method of claim 1, wherein the amino acid is leucine, alanine or norleucine.

3. The method of claim 1, wherein the amino acid ester is composed of an alcoholic portion which is an aliphatic alcohol having 4 to 16 carbon atoms in its molecule.

4. The method of claim 1, wherein the proteih is casein, gelatin, albumin, lactoalbumin, soy protein or fish protein.

5. The method of claim 1, wherein the enzyme is a thiol protease.

6. The method of claim 1, wherein the molecular weight of the enzymatically modified protein is 2,000 to 40,000.

7. The method of claim 1, wherein the enzymatically modified protein is a product prepared by covalently attaching leucine dodecyl ester to gelatin by the action of papain.

8. The method of claim 1, wherein the aqueous medium is an aqueous medium contained in biological tissues.

9. The method of claim 1, wherein the aqueous medium system is a water-in-oil or oil-in-water emulsion system.

10. The method of claim 2, wherein the amino acid ester is composed of an alcoholic portion which is an aliphatic alcohol having 4 to 16 carbon atoms in its molecule.

* * * * *